United States Patent
Miao et al.

(10) Patent No.: US 6,873,760 B2
(45) Date of Patent: Mar. 29, 2005

(54) INTEGRATED OPTICAL FIBER COLLIMATOR

(75) Inventors: Cheng-Hsi Miao, San Jose, CA (US); Yeou-Yen Cheng, Saratoga, CA (US)

(73) Assignee: Opti Work, Inc., Fremont, CA (US)

( * ) Notice: Subject to any disclaimer, the term of this patent is extended or adjusted under 35 U.S.C. 154(b) by 0 days.

(21) Appl. No.: 10/391,857

(22) Filed: Mar. 18, 2003

(65) Prior Publication Data

US 2004/0184725 A1 Sep. 23, 2004

Related U.S. Application Data

(60) Provisional application No. 60/365,594, filed on Mar. 19, 2002.

(51) Int. Cl.⁷ .................................................. G02B 6/32
(52) U.S. Cl. .............................. 385/33; 385/11; 385/14; 385/36; 385/31; 385/77; 385/78
(58) Field of Search .............................. 385/52, 76, 77, 385/78, 79, 61, 60, 58, 59, 57, 55, 11, 33, 34, 88, 89, 92, 93, 31, 14, 36

(56) References Cited

U.S. PATENT DOCUMENTS

| | | | |
|---|---|---|---|
| 4,431,258 A | 2/1984 | Fye | 385/36 X |
| 5,127,075 A | 6/1992 | Althaus et al. | 385/94 |
| 5,552,918 A | 9/1996 | Krug et al. | 359/152 |
| 6,168,319 B1 * | 1/2001 | Francis | 385/79 |
| 6,353,691 B1 * | 3/2002 | Li et al. | 385/11 |
| 6,532,325 B2 * | 3/2003 | Liu et al. | 385/34 |
| 6,690,501 B2 * | 2/2004 | Li et al. | 359/251 |
| 2003/0147136 A1 * | 8/2003 | Pan et al. | 359/484 |
| 2003/0206696 A1 * | 11/2003 | Gerber et al. | 385/33 |
| 2004/0027637 A1 * | 2/2004 | Sahashi et al. | 359/280 |

* cited by examiner

Primary Examiner—Brian M. Healy
(74) Attorney, Agent, or Firm—Billy Lau

(57) ABSTRACT

The present invention relates to an integrated optical fiber collimator with a built-in polarizing beam splitter. An embodiment of the present invention includes a housing, an optical fiber, a collimating lens system that includes at least one lens, and a polarizing beam splitter. The optical fiber terminates in the housing at an optical fiber termination. The collimating lens system is in the housing and is in optically communication with the optical fiber through the optical fiber termination. The housing mechanically supports the polarizing beam splitter. The polarizing beam splitter separates the light from the optical fiber into two substantially orthogonally polarized light beams and substantially couples two orthogonally polarized light beams to the optical fiber in conjunction with the collimating lens system.

50 Claims, 2 Drawing Sheets

INTEGRATED OPTICAL FIBER COLLIMATOR

CROSS-REFERENCE TO RELATED APPLICATION

This application claims the benefit of Provisional Patent Application Ser. No. 60/365,594 filed Mar. 19, 2002, which is incorporated by reference herein.

FIELD OF THE INVENTION

This invention generally relates to optical fiber technology. Particularly, this invention relates to an integrated optical fiber collimator that includes a built-in polarizing beam splitter.

BACKGROUND OF THE INVENTION

Optical fiber technology is widely applied in communication, including telecommunication, data communication, and cable television. A high performance optical fiber system such as an optical fiber communication system desires that all optical modules employed in the system to be polarization insensitive. Optical performance and polarization insensitivity are competing goals. To achieve high performance, the optical modules in a high performance optical fiber system employ high performance optical materials. Unfortunately, many high performance optical materials are polarization sensitive. Techniques have been developed to construct polarization insensitive high performance optical modules with polarization sensitive high performance optical materials.

A popular technique to achieve polarization insensitivity in an optical module is to collimate the light entering the optical module through an optical fiber with an optical fiber collimator and then separate the collimated light beam into a first polarized light beam and a second polarized light beam with a polarizing beam splitter. The first and second polarized light beams are physically separated. The polarization of the first polarized light beam is orthogonal to the second polarized light beam. The polarization of either the first or the second polarized light beam is then rotated ninety degrees so that the first and second polarized light beams have the same polarization state. The first and second polarized light beams then enter the polarization sensitive section of the optical module, which may include polarization sensitive high performance optical materials. The polarization sensitive section of the optical module processes the first and second polarized light beams into first and second processed light beams respectively. When exiting the polarization sensitive section of the optical module, the polarization of either the first or the second processed light beam is rotated ninety degrees. After that, a second polarizing beam splitter combines the first and the second processed light beams into a single light beam. Then a second optical fiber collimator couples the single light beam to an optical fiber. One skilled in the art understands that the arrangement for processing the light from an optical fiber into two orthogonally polarized light beams with an optical fiber collimator and a polarizing beam splitter is identical to the arrangement for processing two orthogonally polarized light beams into a single light beam and couples the single light beam to an optical fiber with a polarizing beam splitter and an optical fiber collimator. The primary difference between the arrangements is the light propagation directions. One skilled in the art further understands that all physical optical components, including optical fiber collimator, collimating lens system, and beam splitter, may only substantially perform their intended function and unable to perform their intended function perfectly. Additionally, one skilled in the art may refer to the polarization state of a light beam as the polarization of the light beam. Because the first and second light beams have identical polarization when they pass through the polarization sensitive section of the optical module, the polarization sensitive section of the optical module processes them equally. Consequently, the optical module is polarization sensitive.

A commonly employed arrangement for collimating the light from an optical fiber and separating the collimated light beam into two orthogonally polarized light beams is shown in FIG. 1. The arrangement includes optical fiber collimator 103 and polarizing beam displacer 102 on baseplate 100. A polarizing beam displacer is a polarizing beam splitter that separates a light beam into two substantially orthogonally polarized parallel light beams that are physically separated. Referring to FIG. 1, an optical fiber collimator includes housing 101, collimating lens 114, and the end portion of optical fiber 111. At the end of optical fiber 111 is optical fiber termination 113. Fiber ferrule 112 provides structural support to optical fiber 111. Housing 101 holds fiber ferrule 112 and collimating lens 114. Collimating lens 114 collimates the light from optical fiber 111 through optical fiber termination 113 into a collimated light beam, which may have any polarization. Light path 120 of the collimated light beam is shown as the dot-dash line in FIG. 1. Beam displacer 102 separated the collimated light beam into a first and a second polarized light beam. Light path 121 and light path 122 are the light paths of the first polarized light beam and second polarized light beam respectively. The polarization of the first polarized light beam is substantially orthogonal to the polarization of the second polarized light beam. FIG. 1 shows that housing 101 directly and mechanically supports collimating lens 114 and fiber ferrule 112, and baseplate 100 directly and mechanically supports housing 101 and polarizing beam displacer 102. This arrangement can also be used to couple two orthogonally polarized light beams in an optical fiber. One skilled in the art understands that this arrangement has numerous applications besides the one stated above and there are numerous optical fiber collimator designs besides that shown in FIG. 1.

The above arrangement is commonly employed in optical modules. One of the steps in the fabrication process of the optical modules is to align the optical fiber collimator, the polarizing beam splitter, and other optical components in the optical modules. Align the optical fiber collimator, the polarizing beam splitter, and other optical components in the same step can be challenging because it involves aligning more than two optical components. It is desirable to integrate the polarizing beam splitter to the optical fiber collimator and align the two to form an integrated optical fiber collimator. By doing so, the number of optical components that require alignment in the fabrication of the optical module may be reduced and alignment process may be simplified. It is an object of this invention to provide an integrated optical fiber collimator that includes a built-in polarizing beam splitter.

SUMMARY OF THE INVENTION

According to this invention, an embodiment of the present invention includes a housing, an optical fiber, a collimating lens system of at least one lens, and a polarizing beam splitter. The optical fiber terminates in the housing at an optical fiber termination. The collimating lens system is in the housing and is in optically communication with the optical fiber through the optical fiber termination. The housing mechanically supports the polarizing beam splitter. The polarizing beam splitter separates the light from the optical fiber into two substantially orthogonally polarized light beams and substantially couples two orthogonally polarized light beams to the optical fiber in conjunction with the collimating lens system.

DESCRIPTION OF THE DRAWINGS

A better understanding of the invention may be gained from the consideration of the following detailed description taken in conjunction with the accompanying drawings in which.

DETAILED DESCRIPTION OF THE INVENTION

Figure 1:
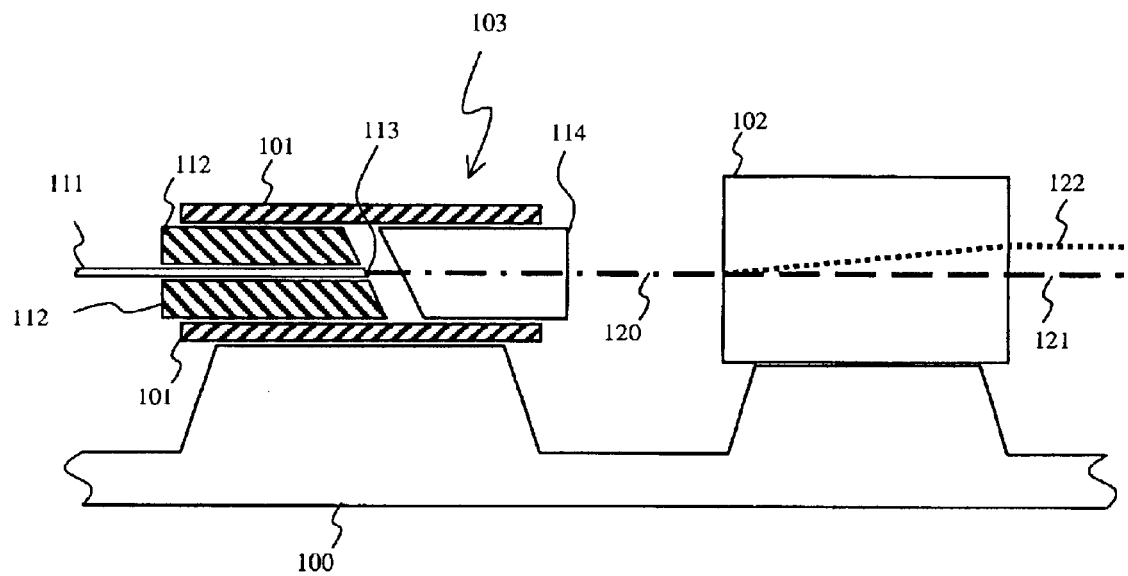
FIG. 1 shows the configuration of a common arrangement for collimating the light from an optical fiber and separating the collimated light beam into two orthogonally polarized light beams.

In the description that follows, like parts are indicated throughout the specification and drawings with the same reference numerals. The present invention is not limited to the specific embodiments illustrated herein.

Figure 2:
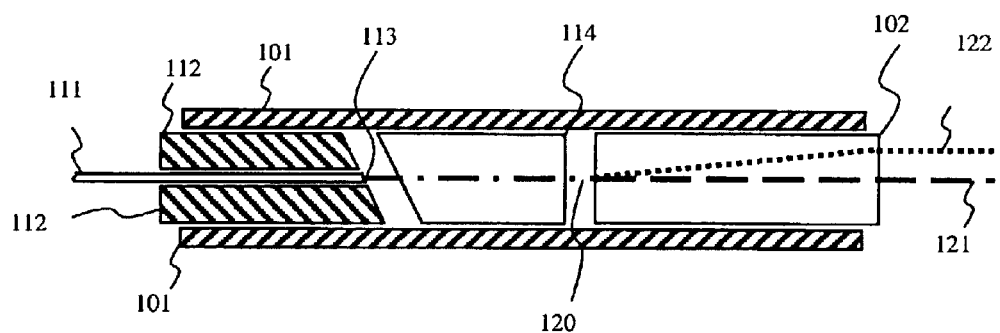
FIG. 2 shows the configuration of an embodiment of the present invention.

FIG. 2 shows the configuration of an embodiment of this invention. Referring to FIG. 2, an end portion of optical fiber 111 is inside fiber ferrule 112. At the end of optical fiber 111 is optical fiber termination 113. Optical fiber termination 113 and the surface of fiber ferrule 112 adjacent to optical fiber termination 113 are polished. One skilled in the art readily understands that the normal to the polished surfaces of optical fiber termination 113 and fiber ferrule 112 are typically at a small angle to the optical axis of optical fiber 111 at optical fiber termination 113. This small angle is optional and useful in reducing reflection. Collimating lens 114 collimates the light emitted from optical fiber 111 through optical fiber termination 113 into a collimated light beam. This collimated light beam may have any polarization. Light path 120 of the collimated light beam is shown as the dot-dash line in FIG. 2. In this embodiment, beam displacer 102 separated the collimated light beam into a first and a second polarized light beams. Light path 121 and light path 122 are the light paths of the first polarized light beam and the second polarized light beam respectively. The polarization of the first polarized light beam is orthogonal to the polarization of the second polarized light beam. As discussed above, two orthogonally polarized light beams can be couple into optical fiber 111 with this embodiment. FIG. 2 also shows that housing 101 directly and mechanically supports collimating lens 114 and polarizing beam displacer 102.

Figure 3:
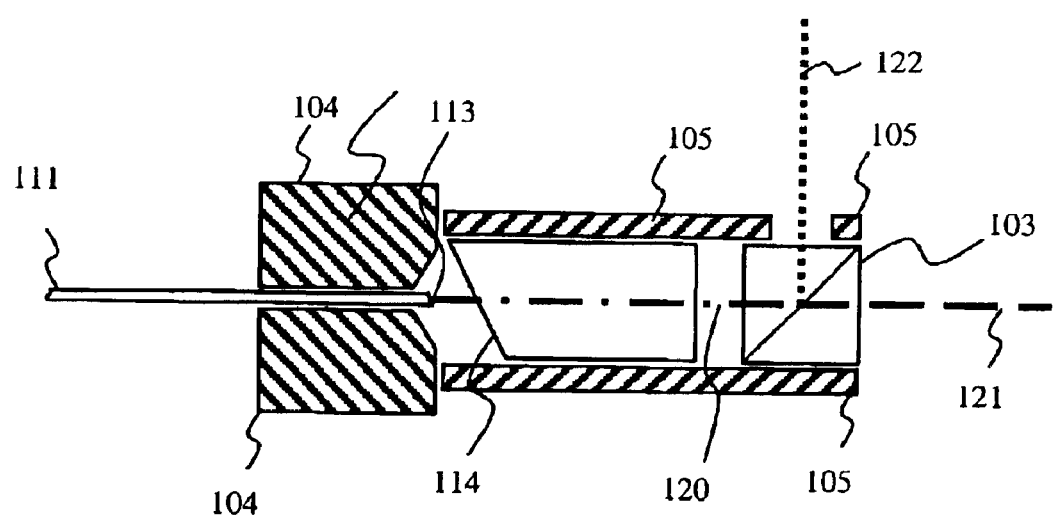
FIG. 3 shows the configuration of an alternative embodiment of the present invention.

FIG. 3 shows the configuration of an alternative embodiment of this invention. In this embodiment, a cube polarizing beam splitter 103 is employed instead of a polarizing beam displacer and the fiber ferrule is eliminated. One skilled in the art understands that the optical fiber termination 113 in this configuration is typically formed by cleaving optical fiber 111. Further, a multiple-piece housing, which includes first housing 104 and second housing 105, is employed instead of a single-piece housing. The offset between the optical axis of optical fiber 111 and the optical axis of collimating lens 114 may be adjust during the alignment phase of the fabrication of this embodiment by adjusting the relative offset of first housing 104 and second housing 105. FIG. 3 also shows that second housing 105 directly and mechanically supports collimating lens 114 and cube polarizing beam splitter 103.

There are numerous variations to the embodiments above trivial to one skilled in the art. Examples of these variations include but not limited to:

the single collimating lens 114 shown in the figures is replaced by a collimating lens system including at least one lens; and the numerous types of polarizing beam splitters; representative examples include Glen-Laser Prism, Wollaston Prism, Beamsplitting Thompson Prism, polarizing beam displacer, and polarizing cube beam splitter.

Although the embodiment of the invention has been illustrated and that the form has been described, it is readily apparent to those skilled in the art that various modifications may be made therein without departing from the spirit of the invention.

What is claimed is:

1. An integrated optical fiber collimator, comprising:

a housing;

an optical fiber extending into said housing having an optical fiber termination in said housing;

a collimating lens system in said housing being directly and mechanically supported by said housing and being optically coupled to said optical fiber; and a polarizing beam splitter being directly and mechanically supported by said housing and being optically coupled to said optical fiber through said collimating lens system.

2. The integrated optical fiber collimator as claimed in claim 1, wherein, said collimating lens system comprises a lens.

3. The integrated optical fiber collimator as claimed in claim 1, wherein, said collimating lens system comprises a plurality of lenses.

4. The integrated optical fiber collimator as claimed in claim 1, wherein, said polarizing beam splitter comprises a polarizing beam displacer.

5. The integrated optical fiber collimator as claimed in claim 1, wherein, said polarizing beam splitter comprises a Glen-Laser Prism.

6. The integrated optical fiber collimator as claimed in claim 1, wherein, said polarizing beam splitter comprises a Wollaston Prism.

7. The integrated optical fiber collimator as claimed in claim 1, wherein, said polarizing beam splitter comprises a Beamsplitting Thompson Prism.

8. The integrated optical fiber collimator as claimed in claim 1, wherein, said polarizing beam splitter comprises a polarizing cube beam splitter.

9. The integrated optical fiber collimator as claimed in claim 1, further comprising:

a fiber ferrule in said housing mechanically supporting a portion of said optical fiber.

10. The integrated optical fiber collimator as claimed in claim 1, wherein, said housing comprises a single-piece housing.

11. The integrated optical fiber collimator as claimed in claim 1, wherein, said housing comprises a multi-piece housing having at least two pieces.

12. The integrated optical fiber collimator as claimed in claim 11, wherein, said housing, further comprising:
a first housing; and
a second housing.

13. The integrated optical fiber collimator as claimed in claim 12, wherein
said end portion of said optical fiber is in said first housing;
said collimating lens system is in said second housing and being directly and mechanically supported by said second housing; and
said polarizing beam splitter is at least partially in said second housing and being directly and mechanically supported by said second housing.

14. The integrated optical fiber collimator as claimed in claim 13, further comprising:
a fiber ferrule in said housing mechanically supporting a portion of said optical fiber.

15. The integrated optical fiber collimator as claimed in claim 13, wherein, said polarizing beam splitter comprises a polarizing beam displacer.

16. The integrated optical fiber collimator as claimed in claim 13, wherein, said beam splitter comprises a cube beam splitter.

17. The integrated optical fiber collimator as claimed in claim 12, further comprising:
a fiber ferrule in said housing mechanically supporting a portion of said optical fiber.

18. The integrated optical fiber collimator as claimed in claim 17, wherein, said polarizing beam splitter comprises a polarizing beam displacer.

19. The integrated optical fiber collimator as claimed in claim 17, wherein, said beam splitter comprises a cube beam splitter.

20. The integrated optical fiber collimator as claimed in claim 2, wherein, said polarizing beam splitter comprises a polarizing beam displacer.

21. The integrated optical fiber collimator as claimed in claim 2, wherein, said beam splitter comprises a cube beam splitter.

22. An integrated optical fiber collimator, comprising:
a housing means;
an optical fiber extending into said housing means having an optical fiber termination in said housing means;
a collimating means in said housing means and being directly and mechanically supported by said housing means for collimating the light traveling from said optical fiber through said optical fiber termination into a substantially collimated light beam and collecting light from the outside of said housing means into said optical fiber; and
a polarizing means in said housing means and being directly and mechanically supported by said housing means for separating said substantially collimated light beam into two collimated light beams of substantially mutually orthogonal polarizations and combining light of mutually orthogonal polarizations from the outside of said housing.

23. The integrated optical fiber collimator as claimed in claim 22, wherein, said housing means comprises a housing.

24. The integrated optical fiber collimator as claimed in claim 22, wherein, said housing means comprises a multi-piece housing having at least two pieces.

25. The integrated optical fiber collimator as claimed in claim 24, wherein, said housing means comprises:
a first housing; and
a second housing.

26. The integrated optical fiber collimator as claimed in claim 22, wherein, said collimating means comprises a collimating lens system.

27. The integrated optical fiber collimator as claimed in claim 26, wherein, said collimating lens system comprises at least one lens.

28. The integrated optical fiber collimator as claimed in claim 22, wherein, said polarizing means comprises a polarizing beam displacer.

29. The integrated optical fiber collimator as claimed in claim 22, wherein, said polarizing means comprises a Glen-Laser Prism.

30. The integrated optical fiber collimator as claimed in claim 22, wherein, said polarizing means comprises a Wollaston Prism.

31. The integrated optical fiber collimator as claimed in claim 22, wherein, said polarizing means comprises a Beam-splitting Thompson Prism.

32. The integrated optical fiber collimator as claimed in claim 22, wherein, said polarizing means comprises a polarizing cube beam splitter.

33. The integrated optical fiber collimator as claimed in claim 22, further comprising:
a fiber ferrule in said housing mechanically supporting a portion of said optical fiber.

34. An integrated optical fiber collimator, comprising:
a housing having a first channel and a second channel, said first channel being coupled to said second channel;
an optical fiber having an optical fiber termination in said housing, an end portion of said optical fiber being in said first channel;
a collimating lens system in said second channel being directly and mechanically supported by said housing and being optically coupled to said optical fiber through said optical fiber termination; and
a polarizing beam splitter being at least a partially in said housing and being directly and mechanically supported by said housing separating the light from said optical fiber into two substantially orthogonally polarized light beams and substantially coupling two orthogonally polarized light beams optically to said optical fiber in conjunction with said collimating lens system.

35. The integrated optical fiber collimator as claimed in claim 34, wherein, said housing means comprises a multi-piece housing having at least two pieces.

36. The integrated optical fiber collimator as claimed in claim 34, further comprising:
a fiber ferrule in said housing mechanically supporting a portion of said optical fiber.

37. The integrated optical fiber collimator as claimed in claim 36, wherein, said collimating lens system comprises at least one lens.

38. The integrated optical fiber collimator as claimed in claim 34, wherein, said polarizing means comprises a polarizing beam displacer.

39. The integrated optical fiber collimator as claimed in claim 34, wherein, said polarizing means comprises a Glen-Laser Prism.

40. The integrated optical fiber collimator as claimed in claim 34, wherein, said polarizing means comprises a Wollaston Prism.

41. The integrated optical fiber collimator as claimed in claim 34, wherein, said polarizing means comprises a Beam-splitting Thompson Prism.

42. The integrated optical fiber collimator as claimed in claim 34, wherein, said polarizing means comprises a polarizing cube beam splitter.

43. An integrated optical fiber collimator, comprising:

an optical fiber collimator having a collimating lens and a housing that directly and mechanically supports said collimating lens; and a polarizing beam splitter being in said housing and being directly and mechanically supported by said housing separating the light from said optical fiber collimator into two substantially orthogonally polarized light beams and substantially coupling two orthogonally polarized light beams optically to said optical fiber collimator.

44. The integrated optical fiber collimator as claimed in claim 43, wherein, at least a portion of said polarizing beam splitter is disposed in said housing.

45. The integrated optical fiber collimator as claimed in claim 43, wherein, said polarizing beam splitter permanently attaches to said housing.

46. The integrated optical fiber collimator as claimed in claim 43, wherein, said polarizing means comprises a polarizing beam displacer.

47. The integrated optical fiber collimator as claimed in claim 43, wherein, said polarizing means comprises a Glen-Laser Prism.

48. The integrated optical fiber collimator as claimed in claim 43, wherein, said polarizing means comprises a Wollaston Prism.

49. The integrated optical fiber collimator as claimed in claim 43, wherein, said polarizing means comprises a Beam-splitting Thompson Prism.

50. The integrated optical fiber collimator as claimed in claim 43, wherein, said polarizing means comprises a polarizing cube beam splitter.

* * * * *